(12) United States Patent
Takeshima (10) Patent No.: US 12,461,176 B2
(45) Date of Patent: Nov. 4, 2025

(54) MAGNETIC RESONANCE SIMULATION APPARATUS, MAGNETIC RESONANCE SIMULATION METHOD, AND COMPUTER-READABLE NONVOLATILE STORAGE MEDIUM STORING MAGNETIC RESONANCE SIMULATION PROGRAM

(71) Applicant: CANON MEDICAL SYSTEMS CORPORATION, Otawara (JP)

(72) Inventor: Hidenori Takeshima, Taito (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 107 days.

(21) Appl. No.: 18/517,046

(22) Filed: Nov. 22, 2023

(65) Prior Publication Data

US 2024/0230805 A1    Jul. 11, 2024

(30) Foreign Application Priority Data

Jan. 6, 2023 (JP) .................................. 2023-001067

(51) Int. Cl.
*G01R 33/36* (2006.01)
*G01R 33/44* (2006.01)

(52) U.S. Cl.
CPC ....... *G01R 33/3621* (2013.01); *G01R 33/443* (2013.01)

(58) Field of Classification Search
CPC .............. G01R 33/3621; G01R 33/443; G01R 33/5608
See application file for complete search history.

(56) References Cited

U.S. PATENT DOCUMENTS

2007/0225591 A1* 9/2007 Derbyshire ........ G01R 33/5613
600/410

OTHER PUBLICATIONS

Graf et al., "Accuracy and performance analysis for Bloch and Bloch-McConnell simulation methods", Journal of Magnetic Resonance 329, 2021, 14 pages.

* cited by examiner

*Primary Examiner* — G.M. A Hyder
(74) *Attorney, Agent, or Firm* — Oblon, McClelland, Maier & Neustadt, L.L.P.

(57) ABSTRACT

A MR simulation apparatus according to an embodiment includes an input interface, central processing circuitry, and numerical processing circuitry. The input interface inputs a subsequence, being to be a subject of a simulation of a MR phenomenon, of a MR pulse sequence; and a plurality of isochromats having a same Bo shift at different positions corresponding to subvoxels which are segments of each of voxels related to the simulation of a MR phenomenon. The central processing circuitry determines, based on the subsequence, two or more isochromats exhibiting equivalent MR phenomenal behaviors as equivalent isochromats from the plurality of isochromats. The numerical processing circuitry collectively simulates MR phenomenal behaviors of the equivalent isochromats due to the subsequence by the same computation.

11 Claims, 5 Drawing Sheets

MAGNETIC RESONANCE SIMULATION APPARATUS, MAGNETIC RESONANCE SIMULATION METHOD, AND COMPUTER-READABLE NONVOLATILE STORAGE MEDIUM STORING MAGNETIC RESONANCE SIMULATION PROGRAM

CROSS-REFERENCE TO RELATED APPLICATION

This application is based upon and claims the benefit of priority from Japanese Patent Application No. 2023-001067, filed on Jan. 6, 2023; the entire contents of which are incorporated herein by reference.

FIELD

Embodiments described herein relate generally to a magnetic resonance simulation apparatus, a magnetic resonance simulation method, and a computer-readable nonvolatile storage medium storing a magnetic resonance simulation program.

BACKGROUND

Traditionally, simulations of a magnetic resonance phenomenon are implemented by numerically solving the Bloch equations successively with respect to magnetizations of a virtual hydrogen atom being an ensemble of hydrogen atoms contained in, for example, a single voxel in a static magnetic field. The Bloch equations phenomenologically describe magnetic resonance. As taught in, for example, C. Graf, A. Rund, C. S. Aigner, R. Stollberger, "Accuracy and Performance Analysis for Bloch and Bloch-McConnell Simulation Methods", Journal of Magnetic Resonance. 2021; 329: 107011. doi: 10.1016/j.jmr.2021.107011 (hereinafter, simply referred to as Document), the Bloch equations are given as Equations (1) below:

$$\begin{cases} \dfrac{dM}{dt}(t, r) = \gamma B(t, r) \times M(t, r) + R(M(t, r)) \text{ for } t \in (0, T), \\ M(0, r) = M_0(r). \end{cases} \quad (1)$$

The symbols and indexes in Equations (1) represent the same as in the Document. For example, in Equations (1) the vector M (t,r) represents a magnetization vector at a spatial position r and at time t. In Equations (1) T represents a terminal time, and γ represents a gyromagnetic ratio. In Equations (1) the vector B (t,r) represents an external magnetic field at the spatial position r and at time t. In Equations (1) the vector R with the magnetization vector M (t,r) as parameters represents a relaxation term. In Equations (1) the vector M (0, r) represents an initial magnetization vector at time t=0 and at the spatial position r. In magnetic resonance simulations, a number of Bloch equations corresponding to the total number of virtual hydrogen atoms arranged in a model for use in the magnetic resonance simulation are solved at optional time.

For the purpose of improving simulations of a magnetic resonance phenomenon in accuracy, each voxel may be split into subvoxels. Thereby, gradient spoiling effects and $T_2^*$ effects can be reproduced by the magnetic resonance simulations, for example.

Splitting one voxel into a large number of subvoxels will, however, enormously increase the amount of computation, resulting in greatly decreasing the computation speed of the magnetic resonance simulation.

DETAILED DESCRIPTION

According to an embodiment, a magnetic resonance simulation apparatus includes an input interface, central processing circuitry, and numerical processing circuitry. The input interface inputs a subsequence of a magnetic resonance pulse sequence and a plurality of isochromats. The subsequence is to be a subject of a simulation of a magnetic resonance phenomenon, and the plurality of isochromats has a same $B_0$ shift at different positions corresponding to subvoxels which are segments of each of voxels related to the simulation of the magnetic resonance phenomenon. The central processing circuitry determines, based on the subsequence, two or more isochromats exhibiting equivalent magnetic resonance phenomenal behaviors as equivalent isochromats from the plurality of isochromats. The numerical processing circuitry collectively simulates magnetic resonance phenomenal behaviors of the equivalent isochromats due to the subsequence by the same computation.

Figure 1:
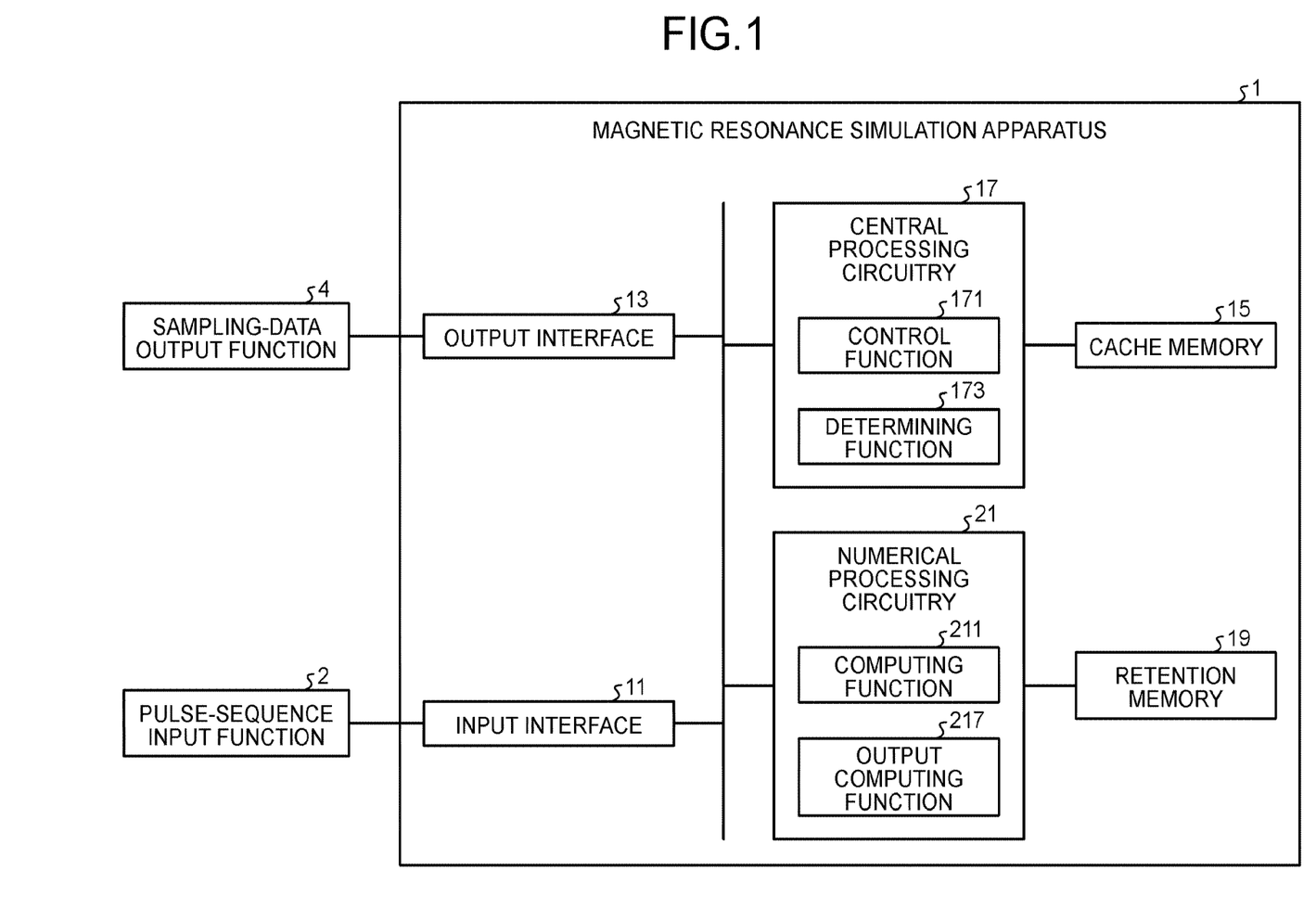
FIG. 1 is a schematic block diagram illustrating an exemplary magnetic resonance simulation apparatus according to an embodiment.

Hereinafter, exemplary embodiments of a magnetic resonance simulation apparatus, a magnetic resonance simulation method, and a magnetic resonance simulation program will be described in detail with reference to the accompanying drawings. FIG. 1 is a schematic block diagram illustrating a magnetic resonance simulation apparatus 1 by way of example.

Embodiment

In the following, for the sake of specificity the magnetic resonance simulation apparatus 1 is defined to compute or simulate a magnetic resonance phenomenon using the Bloch equations which phenomenologically describe magnetic resonance according to classical dynamics. The magnetic resonance simulation apparatus 1 applies, for example, the Rodrigues' rotation formula to numerically simulate magnetic resonance. In addition to the Rodrigues' rotation formula, the magnetic resonance simulation apparatus 1 can apply other methods or approaches, such as Runge-Kutta method and Runge-Kutta method with adaptive time steps, for the numerical simulation of magnetic resonance, as described in the Document. The simulation method based on the Rodrigues' rotation formula is described in the Document and known, therefore, an explanation thereof is omitted herein. This disclosure is similarly applicable to, for example, the Bloch-Torrey equations and the Bloch-McConnel equations, other than the Bloch equations.

The magnetic resonance simulation apparatus 1 may perform simulation of a magnetic resonance phenomenon by quantum-mechanics-based equations such as the Schrödinger equation, in place of the classical-dynamics-based equations. In such a case the magnetic resonance simulation apparatus 1 performs simulation of a magnetic resonance phenomenon by, for example, density matrix simulation.

The magnetic resonance simulation apparatus 1 includes an input interface 11, an output interface 13, a cache memory 15, central processing circuitry 17, a memory 19, and numerical processing circuitry 21. The magnetic resonance simulation apparatus 1 may further include a storage device or devices (e.g., a variety of storages or memories) that store computer programs for implementing various functions to be performed by the central processing circuitry 17 and the numerical processing circuitry 21 and/or store outputs from an output computing function 217. The storage device can be a driver that reads and writes various kinds of information from and to a semiconductor memory device such as a hard disk drive (HDD), a solid state drive (SSD), random access memory (RAM), or flash memory, an optical disk such as a compact disc (CD) and a digital versatile disk (DVD), or a portable storage medium, for example.

The input interface 11 is, for example, electrically connected to a pulse-sequence input function 2 of a magnetic resonance imaging (MRI) apparatus. Specifically, the pulse-sequence input function 2 inputs, to the input interface 11, individual subsequences corresponding to one segment of a pulse sequence output from the sequence control circuitry of the MRI apparatus. Namely, the pulse sequence is composed of multiple subsequences in time series. The input interface 11 is connected to the output terminal of the pulse-sequence input function 2 of the MRI apparatus. The input interface 11 corresponds to an input unit.

The subsequences are broadly sorted into a duration of application of only a gradient magnetic field (Gradient), a duration of application of an RF pulse and a gradient magnetic field (RF & Gradient), a duration of application of a gradient magnetic field and acquisition of magnetic resonance signals for analog-to-digital (A/D) conversion (Gradient & ADC), and a duration of no application of a gradient magnetic field (No-Gradient) in the pulse sequence. For example, the input interface 11 inputs, to the central processing circuitry 17 and the numerical processing circuitry 21, subsequences to be a subject of a magnetic resonance simulation, of a magnetic resonance pulse sequence. Thus, the input interface 11 individually inputs the subsequences from the sequence control circuitry of the MRI apparatus to the central processing circuitry 17 and the numerical processing circuitry 21 in time series. The central processing circuitry 17 and the numerical processing circuitry 21 may be collectively referred to as processing circuitry.

Figure 2:
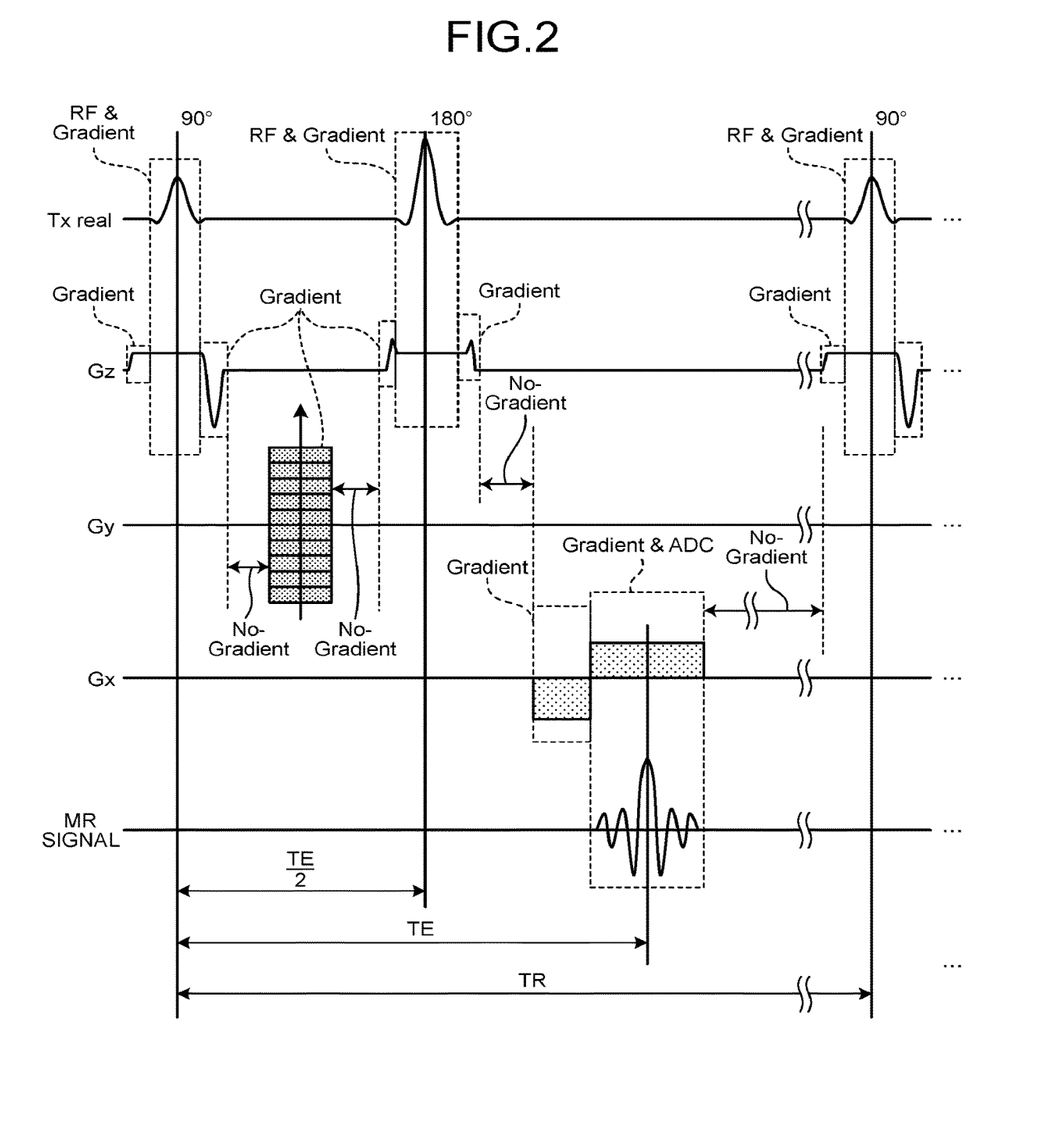
FIG. 2 illustrates a pulse sequence by a spin echo method according to an embodiment, as an example.

FIG. 2 illustrates a pulse sequence according to a spin echo method as an example. In FIG. 2, Tx real represents actual transmission RF pulses. Virtual transmission RF pulses may have the same waveform as the actual transmission RF pulses or a different waveform therefrom. Gz represents a slice-selective gradient magnetic field. Gy represents a phase-encoding gradient magnetic field. Gx represents a readout gradient magnetic field. In the pulse sequence of FIG. 2, a readout gradient magnetic field is applied to acquire MR signals after an echo time (TE) passes from the application of a 90-degree RF pulse. The MR signals are converted into digital signals by an analog-to-digital converter (ADC). Although not shown in FIG. 2, any of various kinds of pulses such as preparation pulse may be suitably applied depending on a pulse sequence type.

As illustrated in FIG. 2, the pulse sequence is represented by a combination of application of a gradient magnetic field (Gradient), application of an RF pulse and a gradient magnetic field (RF & Gradient), application of a gradient magnetic field and A/D conversion (Gradient & ADC), and a duration of no application of a gradient magnetic field (No-Gradient). In the spin echo method of FIG. 2, for example, the combination of Gradient, RF & Gradient, Gradient & ADC, and No-Gradient is repeated a number of times corresponding to the number of phase encoding steps. In each phase encoding, Gradient is calculated in one step and Gradient & ADC repeats the calculation for a number of times equal to the number of ADCs (number of samplings) in FIG. 2. The number of these computations is less than that of RF & Gradient computations, for example.

The pulse-sequence input function 2 inputs, to the input interface 11, Gradient such as prepulse, RF & Gradient, Gradient such as crusher, RF & Gradient, Gradient & ADC, and No-Gradient in time series. The input interface 11 outputs Gradient, RF & Gradient, RF & Gradient, and Gradient & ADC to the central processing circuitry 17 in time series.

The pulse sequence of the present embodiment is not limited to the sequence illustrated in FIG. 2. In a typical pulse sequence a combination of RF & Gradient, Gradient, Gradient & ADC, and No-Gradient is repeated appropriately.

The input interface 11 may also be connected to, for example, the output terminal of the transmitter circuitry and the output terminal of the gradient magnetic field power supply in the MRI apparatus. In this case the subsequences include a voltage and a current corresponding to a gradient magnetic field strength, application timing of the gradient magnetic field, application timing of a current and an RF pulse to be supplied to the transmission coil, and detection timing. The input interface 11 may be connected to, for example, an external apparatus (e.g., sequence generator) capable of generating pulse sequence data containing subsequences for output, in place of the MRI apparatus. The connection between the input interface 11 and any of various kinds of pulse sequence sources may be established via a network.

Further, the input interface 11 may include an input device that receives various kinds of instructions and information inputs from the user. Such an input interface 11 corresponds to, for example, a pointing device such as a mouse and a trackball and an input device such as a keyboard. As an example, the input interface 11 may receive an output instruction as to a result of simulation by the magnetic resonance simulation apparatus 1. The output instruction corresponds to, for example, an IQ signal of each of the voxels.

The input interface 11 inputs multiple isochromats to the central processing circuitry 17 and the numerical processing circuitry 21, for example. The isochromats have the same $B_0$ shift at different positions corresponding to subvoxels which are segments of each of the voxels related to the magnetic resonance simulation. The subvoxels are set by splitting each voxel.

The direction or directions in which a single voxel is split into subvoxels can be set to any direction(s). For the sake of specificity, the voxel splitting directions are defined as three orthogonal axes herein. The three orthogonal axes are, for example, a Z-axis direction being a direction of applying a static magnetic field and X-axis and Y-axis directions along two axes orthogonal to the Z-axis direction. The total number of subvoxels are defined as 64 which results from splitting one voxel into four along the three orthogonal axes. The total number of split subvoxels can be set to any number other than 64.

The $B_0$ shift corresponds to fluctuations in $B_0$ (static magnetic field) of each of the subvoxels, i.e., inhomogeneity of magnetic field. In other words, the $B_0$ shift refers to magnetic fluctuations of multiple molecules included in each subvoxel and indicates incompleteness relative to the resonant frequency defined by the static magnetic field strength. The $B_0$ shift represents fluctuations in resonant frequency in the order of several Hz, for example.

By applying different $B_0$ shifts to the subvoxels, $T_2^*$ effects can be reflected in a result of magnetic resonance simulation. The $B_0$ shift may be uniformly set across all the subvoxels or in a particular direction. One voxel is split into subvoxels in such a manner that at least part of the subvoxels has the same $B_0$ shift value.

Figure 3:
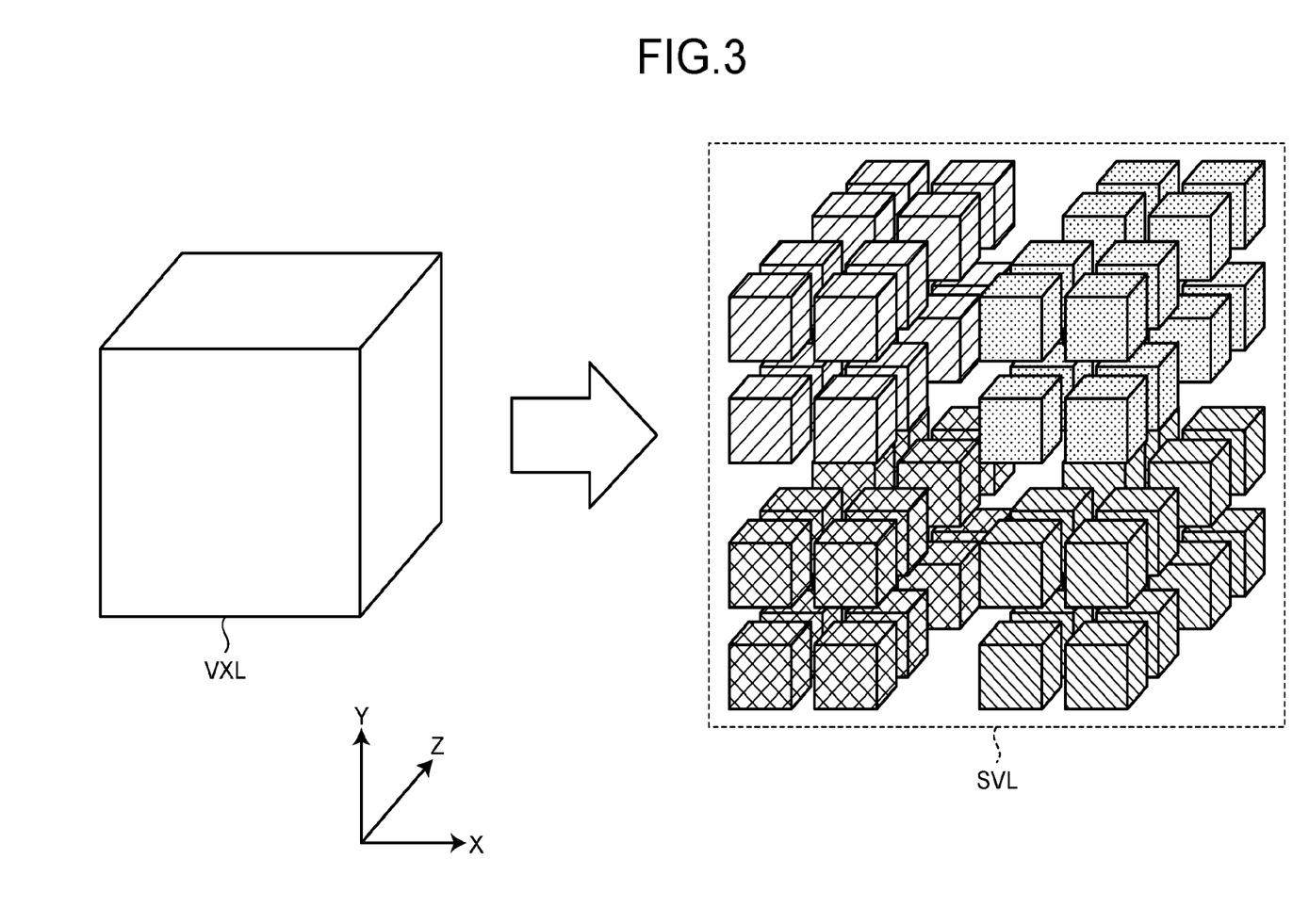
FIG. 3 illustrates an example of splitting one voxel into 64 subvoxels according to an embodiment.

FIG. 3 illustrates an example that a voxel VXL is split into 64 subvoxels SVL. As illustrated in FIG. 3, the voxel VXL is split into four in X-axis, Y-axis, and Z-axis directions. The subvoxels with the same $B_0$ shift value are indicated by the same hatching pattern in FIG. 3. The $B_0$ shift value may not uniformly vary in all the three directions unlike in FIG. 3, and may vary in any direction(s).

The frequency (number of subvoxels) distribution of the $B_0$ shift values relative to the $B_0$ shift values is, for example, set to a Lorenztian distribution (also referred to as a Lorentz curve or Cauchy distribution) in order to reflect T2* effects in the magnetic resonance simulation result. In the following, it is assumed that the voxel VXL be split into the multiple subvoxels SVL, as shown in FIG. 3.

Multiple isochromats are set with respect to the multiple subvoxels. Each of the isochromats is a representative point of each of the subvoxels and corresponds to an ensemble with multiple physical parameters. Namely, each isochromat is similar to a point mass. The physical parameters may be exemplified by, but not limited to, magnetization, $T_1$, $T_2$, and else. The physical parameters may include other physical parameter or parameters. The ensemble may further include other parameter or parameters such as magnetic transfer (MT) or diffusional parameters in the Bloch-Torrey equation, in addition to the physical parameters as above.

The output interface 13 is, for example, connected to a sampling-data output function 4 of the sequence control circuitry in the MRI apparatus. The output interface 13 outputs output values computed by the output computing function 217 to the sampling-data output function 4, under the control of a control function 171. The output interface 13 may be connected to various kinds of devices (such as a display, an analyzer, and an image generator) that use such output values for display, analysis, or processing, in addition to the sequence control circuitry. The output interface 13 and various kinds of devices being destinations of output values may be connected together via a network. Further, the output interface 13 may include a display that displays output values and else under the control of the control function 171. Examples of the display include a display device such as a liquid crystal display. The output interface 13 corresponds to an output unit.

The cache memory 15 is connected to the central processing circuitry 17. The cache memory 15 can temporarily store the subsequences. The cache memory 1 corresponds to a temporary storage (CPU memory). The subsequences are associated with Rodrigues' rotation formula matrices held in the memory 19 in, for example, a lookup table. The matrices each indicate a state transition of particles, which is computed by a computing function 211 using part of the pulse sequence (subsequences). For example, the cache memory 15 stores a product of the matrices in the durations where the respective subsequences (Gradient, RF & Gradient, Gradient & ADC, and No-Gradient) are applied, as illustrated in FIG. 2. The product of the matrices represents a resultant state transition through the application of each of the subsequences. The product of the matrices is referred to as a combined transition matrix herein.

The central processing circuitry 17 is implemented by, for example, a processor as a central processing unit (CPU). The central processing circuitry 17 can also be implemented by a combination of circuits such as an application specific integrated circuit (ASIC), a programmable logic device (e.g., simple programmable device logic (SPLD), a complex programmable logic device (CPLD)), and a field programmable gate array (FPGA). The central processing circuitry 17 implements the control function 171 and a determining function 173 by retrieving and executing computer programs from its own memory or a storage (not shown). The central processing circuitry 17 may be referred to as a central computing unit or a central processor.

The central processing circuitry 17 uses the control function 171 to control the respective elements of the magnetic resonance simulation apparatus 1. For example, the central processing circuitry 17 uses the control function 171 to cause the determining function 173 to perform processing to subsequences input via the pulse-sequence input function 2 and the input interface 11. Further, the central processing circuitry 177 uses the control function 171 to output, as sampling data, output values computed by the output computing function 217 to the external apparatus via the output interface 13 and the sampling-data output function 4. The central processing circuitry 17 implementing the control function 171 corresponds to a control unit.

The central processing circuitry 17 uses the determining function 173 to determine, from the multiple isochromats, two or more isochromats exhibiting equivalent magnetic resonance phenomenal behaviors as equivalent isochromats on the basis of a subsequence. Namely, with respect to each of the voxels, the determining function 173 selects two or more equivalent isochromats from the multiple isochromats based on a subsequence. The equivalent isochromats refer to isochromats having the same $B_0$ shift and aligned in the direction orthogonal to the direction in which gradient magnetic fields are applied, or isochromats with the same $B_0$ shift and no gradient magnetic field applied in the subvoxels SVL of the voxel VXL. The central processing circuitry 17 implementing the determining function 173 corresponds to a determiner unit.

As an example, the central processing circuitry 17 uses the determining function 173 to determine isochromats aligned in one or more particular directions as equivalent isochromats. Specifically, the determining function 173 determines based on a subsequence whether magnetic fields in different directions exhibit positional dependence to determine, from among the different directions, one or more directions in which no positional dependence is found, as the particular directions. In other words, with respect to the subvoxels of each of the voxels, the determining function 173 selects, as equivalent isochromats, two or more isochromats having the same $B_0$ shift value and no positional dependence due to the subsequence. In the case of the different directions being the three orthogonal axes, the determining function 173 determine presence or absence of the positional dependence in each of the directions along the three orthogonal axes on the basis of the subsequence.

Specifically, the determining function 173 determines, as equivalent isochromats, two or more isochromats having the same $B_0$ shift and aligned in the X-axis direction and two or more isochromats having the same $B_0$ shift and aligned in the Y-axis direction during the duration (Gradient Gz) where the Z-directional gradient magnetic field (Gz) is applied and during the duration (RF & Gradient Gz) where the RF pulse and the Z-directional gradient magnetic field (Gz) are applied, with reference to FIG. 2. In this manner, 64 isochromats are selected as 16 equivalent isochromats in the example of FIG. 2.

The determining function 173 also determines, as equivalent isochromats, two or more isochromats having the same $B_0$ shift and aligned in the Y-axis direction and two or more isochromats having the same $B_0$ shift and aligned in the Z-axis direction during the duration (Gradient Gx) where the X-directional gradient magnetic field (Gx) is applied and during the duration (Gradient Gx & ADC) where the X-directional gradient magnetic field (Gx) is applied to acquire magnetic resonance signals for A/D conversion In FIG. 2.

In addition, when the subsequence contains no application of the gradient magnetic field, the determining function 173 may not determine presence or absence of the positional dependence. The determination step as to positional dependence may be performed when the subsequence corresponds to the duration of no application of gradient magnetic field (No-Gradient), for example. Specifically, the determining function 173 determines, as equivalent isochromats, two or more isochromats with the same $B_0$ shift during the duration of no application of gradient magnetic field (No-Gradient) in FIG. 2.

The memory 19 is connected to the numerical processing circuitry 21. The memory 19 stores therein matrices corresponding to the subsequences stored in the cache memory 15. Namely, the memory 19 holds matrices each representing a state transition of a virtual atom corresponding to each of the isochromats computed using part of the pulse sequence. The memory 19 corresponds to a graphics processing unit (GPU) memory and can be implemented by, for example, a memory device such as video random access memory (VRAM). The memory 19 also stores results of magnetic resonance simulations. In addition, the memory 19 may store therein various kinds of computer programs for the computing function 211 and the output computing function 217 performed by the numerical processing circuitry 21. The memory 19 corresponds to a holder unit.

The numerical processing circuitry 21 can be implemented by, for example, a processor as a GPU. The numerical processing circuitry 21 can also be implemented by a combination of circuits such as an application specific integrated circuit (ASIC), a programmable logic device (e.g., simple programmable logic device (SPLD), a complex programmable logic device (CPLD)), and a field programmable gate array (FPGA). The central processing circuitry 17 implements the computing function 211 and the output computing function 217 by retrieving and executing computer programs from its own memory or a storage (not shown). The numerical processing circuitry 21 implementing the computing function 211 and the output computing function 217 corresponds to a computing unit and an output computing unit, respectively.

The numerical processing circuitry 21 uses the computing function 211 to collectively simulate magnetic resonance phenomenal behaviors of the equivalent isochromats due to the subsequence by the same computation. For example, the computing function 211 simulates a magnetization caused by the application of the subsequence by multiplying magnetizations of the equivalent isochromats by a combined transition matrix. Specifically, the computing function 211 simulates the magnetizations of the equivalent isochromats by multiplying a magnetization of one (representative isochromat) of the equivalent isochromats by the combined transition matrix. Computing a magnetic resonance phenomenal behavior of the representative isochromat corresponds to computing magnetic resonance phenomenal behaviors of the two or more equivalent isochromats. In this manner the computing function 211 applies the same computation to collectively simulate the magnetic resonance phenomenal behaviors of the two or more equivalent isochromats.

Specifically, in a situation that the subsequence including application of the RF pulse and gradient magnetic field is applied (RF & Gradient), the computing function 211 computes magnetic resonance phenomenal behaviors of two or more equivalent isochromats having the same RF-pulse transmitting sensitivity (hereinafter, referred to as transmission equivalent isochromats) due to the subsequence. For example, the transmission equivalent isochromats are identified or from selected the multiple equivalent isochromats determined by the determining function 173. The computing function 211 or the determining g function 173 identifies or selects the transmission equivalent isochromats from the multiple equivalent isochromats. The computing function 211 collectively simulates the magnetizations of the multiple equivalent isochromats caused by the application of the RF & Gradient subsequence by multiplying the magnetizations of the transmission equivalent isochromats by the combined transition matrix for the RF & Gradient subsequence.

In another situation that the subsequence including application of a gradient magnetic field and acquisition of magnetic resonance signals for A/D conversion is applied (Gradient & ADC), the computing function 211 computes magnetic resonance phenomenal behaviors of two or more equivalent isochromats having the same MR-signal receiving sensitivity (hereinafter, referred to as reception equivalent isochromats) due to the subsequence. For example, the reception equivalent isochromats are identified or selected from the multiple equivalent isochromats determined by the determining function 173. The computing function 211 or the determining function 173 identifies or selects the reception equivalent isochromats from the multiple equivalent isochromats. The computing function 211 collectively simulates the magnetizations of the multiple equivalent isochromats caused by the application of the Gradient & ADC subsequence by multiplying the magnetizations of the reception equivalent isochromats by the combined transition matrix for the Gradient & ADC subsequence.

In still another situation that the subsequence including the duration (No-Gradient) of no application of a gradient magnetic field is applied, the computing function 211 computes magnetic resonance phenomenal behaviors of the multiple equivalent isochromats due to the subsequence. For example, the computing function 211 collectively simulates the magnetizations caused by the application of the No-Gradient subsequence by multiplying the magnetizations of the multiple equivalent isochromats by the combined transition matrix for the No-Gradient subsequence.

In addition, the computing function 211 may adopt simpler Bloch equations for the magnetic resonance simulation. In such a case the computing function 211 can use the same analytical solution to compute the magnetic resonance phenomenal behaviors of the multiple equivalent isochromats, with respect to the Gradient & ADC subsequence and the No-Gradient subsequence with no application of gradient magnetic field. The simpler Bloch equations refer to, for example, the Bloch equations without correction terms. In the analytical solution of the simpler Bloch equations, the X-directional and Y-directional computations are separated from the Z-directional computations.

In addition, the multiple equivalent isochromats have similar $T_1$ and $T_2$ and the same exponential representing a temporal change in magnetization. Because of this, the computing function 211 can collectively simulate, by the same computation, the magnetizations of the equivalent isochromats determined based on the positional dependence due to the application of a gradient magnetic field. To compute time evolution of the magnetizations due to the Gradient & ADC subsequence, it is possible to collectively simulate the magnetizations of the equivalent isochromats having the same receiving sensitivity by the same computation. Thus, the computing function 211 computes the magnetizations of the reception equivalent isochromats by applying the analytical solution thereto.

When the subsequence including the application of a gradient magnetic field and the acquisition of magnetic resonance signals for A/D conversion is applied, the computing function 211 may compute a sum of magnetizations of the isochromats (equivalent isochromats) aligned in the particular direction(s) and multiply the resultant sum of magnetizations by the combined transition matrix for the Gradient & ADC subsequence, to be able to collectively simulate the magnetizations arising from the application of the subsequence by the same computation. Namely, to obtain an integral value of transverse magnetizations with respect to the Gradient & ADC subsequence, the computing function 211 may combine the transverse magnetizations of the equivalent isochromats together to compute the time evolution of the combined transverse magnetization. Thus, the computing function 211 first computes an output value $ADC_{subvoxel}(t)$ for the subvoxels by the following Equation (2):

$$ADC_{subvoxel}(t) = \left( \sum_{i \in subvoxel} s^{(i)} M_{xy}^{(i)}(t) \right) \quad (2)$$

where i in summation sign Σ represents a dummy suffix for identifying the subvoxels, s on the right side represents receiving sensitivity, and $M_{xy}^{(i)}(t)$ represents a combined transverse magnetization of X-axial magnetizations and Y-axial magnetizations.

By use of the simpler Bloch equations for the magnetic resonance simulation, the computing function 211 then computes a change in transverse magnetization (time evolution of transverse magnetization) between samplings in the ADC, using the analytical solution. Next, the computing function 211 computes the output value from the ADC by the following Equation (3):

$$ADC(t) = \sum_{j \in subvoxel-blocks} ADC_{subvoxel}(t) \quad (3)$$

According to Equation (3), the output value ADC(t) is calculated by summing up output values $ADC_{subvoxel}(t)$ for the subvoxels.

In response to receipt of an output instruction as to a magnetic resonance simulation result through the input interface 11, the numerical processing circuitry 21 uses the output computing function 217 to compute an output value responsive to the output instruction based on the magnetic resonance simulation result. When the output instruction is in the form of an IQ signal, for example, the output computing function 217 sums up the respective components (Mx, My, Mz) of magnetization vectors M of virtual atoms to thereby compute the output values, i.e., a sum (ΣMx) of the x-components of the magnetization vectors M, a sum (ΣMy) of the y-components of the magnetization vectors M, and a sum (ΣMz) of the z-components of the magnetization vectors M. Alternatively, the output computing function 217 may generate a virtual image and an actual image by the inverse Fourier transformation of the IQ signals (ΣMx, ΣMy), to generate an MR image based on the simulation result.

Now, a simulation process of a magnetic resonance phenomenon (hereinafter, MR simulation process) to be performed by the above-configured magnetic resonance simulation apparatus 1 in the present embodiment will be described. FIG. 3 is a schematic diagram illustrating the outline of an MR simulation process as an example. The RF & Gradient pattern corresponds to the RF & Gradient being a combination of the RF pulse and the gradient magnetic field in FIG. 2 and corresponds to an input pattern stored in the cache memory 15.

Figure 4:
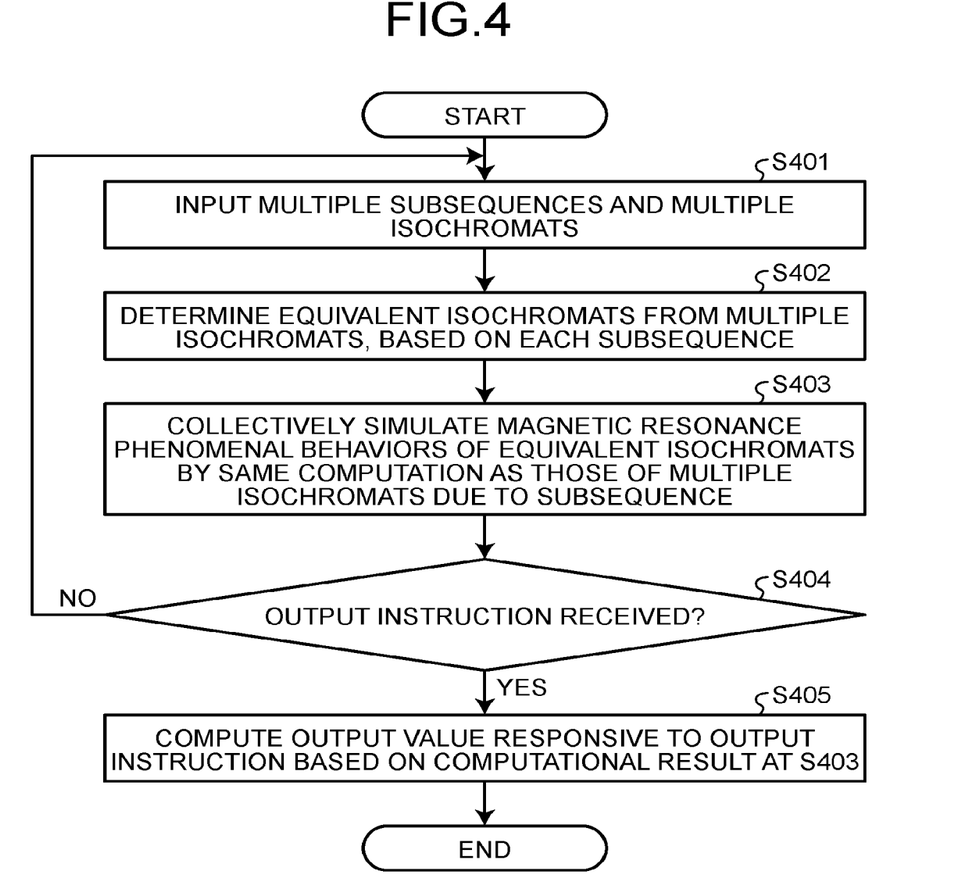
FIG. 4 is a flowchart illustrating an example of an MR simulation procedure according to an embodiment.

FIG. 4 is a flowchart illustrating an exemplary MR simulation procedure. Prior to a start of the MR simulation process, the input interface 11 becomes connected to the external apparatus that outputs pulse sequences (e.g., the sequence control circuitry of the MRI apparatus or a sequencer). Also, the output interface 13 becomes connected to the external apparatus to which output values are output (e.g., the MRI apparatus, an image generator, or an output analyzer).

For the purpose of easily identifying the equivalent isochromats or decreasing the storage capacity, for example, it may not be necessary to individually store all sets of isochromat-specific information (e.g., $M_0$, $T_1$, $T_2$, $B_0$ shift, and their additional information when using Bloch-Torrey, Bloch-McConnell, or density matrices) regarding the isochromats differing in position alone. In this case, for example, the isochromats are classified into representative isochromats and associative isochromats resulting from the subvoxel splitting. The isochromat-specific information of all the representative isochromats is held while the isochromat-specific information of the associative isochromats can be calculated from the representative isochromats by utilizing isochromat-difference information. The isochromat-difference information refers to, for example, information indicating positional shifts (0.1 mm, −0.1 mm, 0.0 mm) of isochromats in (X, Y, Z) directions, respectively. The associative isochromats can be generated by applying the same method to different representative isochromats, and only a single piece of isochromat-difference information as to such associative isochromats is to be stored, thereby making it possible to easily identify the equivalent isochromats or decrease the storage capacity.

The three orthogonal axes may be three orthogonal rotation axes derived from rotating the X, Y, and Z-axes in any direction, in place of the X, Y, and Z-axes. If use of such rotation axes for the pulse sequence to be a subject of the simulation is known or expected, this disclosure can be effectively utilized by splitting each voxel into subvoxels in the directions along the three orthogonal rotation axes (or using the isochromat-difference information containing information indicating positional shifts in the directions along the three orthogonal rotation axes).

MR Simulation Process

Step S401

Multiple subsequences are input to the input interface 11 from the pulse-sequence input function 2 of the external apparatus. The input interface 11 inputs the subsequences to the central processing circuitry 17. The input interface 11 also inputs multiple isochromats to the central processing circuitry 17 and the numerical processing circuitry 21. The isochromats correspond to an ensemble having physical parameters at a representative point of the subvoxels, for example.

Step S402

The central processing circuitry 17 uses the determining function 173 to determine two or more equivalent isochromats from the multiple isochromats, based on each of the subsequences. For example, the determining function 173 isochromats, determines, as the two or more equivalent isochromats aligned in particular directions with no positional dependence found. Specifically, the determining function 173 determines whether or not magnetic fields in multiple directions exhibit positional dependence with reference to the direction of an applied gradient magnetic field in the subsequence, to determine a direction or directions, of the multiple directions, with no positional dependence found as the particular direction(s).

For example, the multiple directions are the three orthogonal axes, and the determining function 173 determines presence or absence of the positional dependence in each of directions along the three orthogonal axes. Without application of a gradient magnetic field in the subsequence, however, the determining function 173 may perform no determination as to the positional dependence and skip this step. The determining function 173 then determines the multiple isochromats as the equivalent isochromats. The determining function 173 outputs the equivalent isochromats to the numerical processing circuitry 21 in association with the subsequence.

Step S403

The numerical processing circuitry 21 uses the computing function 211 to collectively simulate magnetic resonance phenomenal behaviors of the equivalent isochromats by the same computation as those of the multiple isochromats due to the subsequence. Specifically, when the subsequence including application of an RF pulse and a gradient magnetic field is applied (RF & Gradient Gz), the computing function 211 computes magnetic resonance phenomenal behaviors of two or more equivalent isochromats having the same RF-pulse transmitting sensitivity due to the subsequence. When the subsequence including the duration of no application of a gradient magnetic field (No-Gradient) is applied, the computing function 211 computes magnetic resonance phenomenal behaviors of the two or more equivalent isochromats due to the subsequence.

Further, when the subsequence including application of a gradient magnetic field and acquisition of magnetic resonance signals for A/D conversion (Gradient & ADC) is applied, the computing function 211 computes magnetic resonance phenomenal behaviors of two or more equivalent isochromats having the same MR-signal receiving sensitivity due to the subsequence. Alternatively, with respect to the Gradient & ADC subsequence, the computing function 211 may compute a sum of magnetizations in multiple isochromats aligned in a particular direction or directions and simulate a magnetic resonance phenomenal behavior due to the subsequence for the sum of magnetizations.

Step S404

In response to an input of an output instruction from the input interface 11 (Yes at step S404), the operation at step S405 is performed. Without an output instruction from the input interface 11 (No at step S404), the process is repeated from step S401. If all of the subsequences of the pulse sequence have been inputted at step S401, step S401 may be skipped. The process then proceeds to step S405 from step S404.

Step S405

The output computing function 217 computes, as sampling data, an output value responsive to the output instruction from a result of the computation (magnetic resonance simulation result) at step S403. The control function 171 outputs the resultant output value to the sampling-data output function 4 of the external apparatus such as the MRI apparatus via the output interface 13. As a modification of the present embodiment, the various functions that implement the MR simulation process may be incorporated in the MRI apparatus.

According to some embodiments described above, the magnetic resonance simulation apparatus 1 inputs a subsequence of a magnetic resonance pulse sequence and multiple isochromats. The subsequence is to be a subject of a magnetic resonance simulation, and the multiple isochromats have the same $B_0$ shift at different positions corresponding to subvoxels which are segments of each of voxels related to the magnetic resonance simulation. The magnetic resonance simulation apparatus 1 then determines two or more isochromats exhibiting equivalent magnetic resonance phenomenal behaviors as equivalent isochromats from the multiple isochromats on the basis of the subsequence, and collectively simulates magnetic resonance phenomenal behaviors of the equivalent isochromats due to the subsequence by the same computation. In addition, the magnetic resonance simulation apparatus 1 according to some embodiments determines, for example, two or more isochromats aligned in one or more particular directions to be the equivalent isochromats.

For example, the magnetic resonance simulation apparatus 1 according to some embodiments determines based on the subsequence whether magnetic fields in multiple directions have positional dependence, to determine one or more directions of the multiple directions with no positional dependence found as the particular directions. In this case the multiple directions are three orthogonal axes, and the magnetic resonance simulation apparatus 1 determines, based on the subsequence, presence or absence of the positional dependence in each of directions along the three orthogonal axes. Alternatively, the magnetic resonance simulation apparatus 1 according to some embodiments may not determine presence or absence of the positional dependence when the subsequence contains no application of a gradient magnetic field.

When the subsequence including application of an RF pulse and a gradient magnetic field is applied, the magnetic resonance simulation apparatus 1 of some embodiments simulates magnetic resonance phenomenal behaviors, caused by the subsequence, of two or more equivalent isochromats having the same RF-pulse transmitting sensitivity. When the subsequence including application of a gradient magnetic field and acquisition of magnetic resonance signals for A/D conversion is applied, the magnetic resonance simulation apparatus 1 of some embodiments simulates magnetic resonance phenomenal behaviors, caused by the subsequence, of two or more equivalent isochromats having the same MR-signal receiving sensitivity.

Alternatively, in response to the subsequence including application of a gradient magnetic field and acquisition of magnetic resonance signals for A/D conversion, the magnetic resonance simulation apparatus 1 of some embodiments may compute a sum of magnetizations in multiple isochromats aligned in the particular directions to simulate a magnetic resonance phenomenal behavior due to the subsequence for the sum of magnetizations.

As a comparison, a conventional computation of an output value ADC(t) is, for example represented by the following Equation (4):

$$ADC(t) = \sum_{i \in all-voxel} s^{(i)} M_{xy}^{(i)}(t) \quad (4)$$

Traditionally, as shown in Equation (4), transverse magnetization $M_{xy}^{(i)}(t)$ in each of the subvoxels needs to be calculated. Thus, in calculating the output value ADC(t) in a traditional manner, it is necessary to calculate time evolution of the transverse magnetization $M_{xy}^{(i)}(t)$ for every one of the subvoxels. In contrast, the magnetic resonance simulation apparatus 1 of the present embodiment combines transverse magnetizations together over the subvoxels in advance, as shown in Equation (2), making it possible to significantly shorten the computation time.

For the reasons above, the magnetic resonance simulation apparatus 1 according to some embodiments can apply the same mathematic formula describing a magnetization behavior to multiple equivalent isochromats with the same $B_0$ shift value and no positional dependence with respect to application of a gradient magnetic field. This makes it possible to collectively simulate the magnetic resonance phenomenal behaviors of the multiple equivalent isochromats by the same computation. Specifically, in the example of FIG. 2, 64 isochromats are selected as 16 equivalent isochromats, reducing the number of computations from 64 times to 16 times. This reduction of the number of computations concerns a single voxel. Thus, with regard to the number of voxels being 512×512×512=134, 217, 728 in a space of interest, for example, the number of computations can be greatly decreased from 64 times larger than 134,217, 728 to 16 times larger than 134,217,728.

In this manner, the magnetic resonance simulation apparatus 1 according to some embodiments can perform magnetic resonance simulations in a substantially decreased computation time while improving the magnetic resonance simulations in accuracy by segmenting each voxel into multiple subvoxels. In other words, the magnetic resonance simulation apparatus 1 according to some embodiments can improve the simulation speed with respect to the segmented subvoxels.

The magnetic resonance simulation apparatus 1 of the present embodiment can implement full virtualization in a shorter computation time through the magnetic resonance simulation. It is thus beneficial to utilize the magnetic resonance simulation apparatus 1, for example, in educational facilities or at development sites.

In a situation that the magnetic resonance simulation apparatus 1 is used in an educational facility, RF waveforms may be reused within an imaging protocol (e.g., reuse of waveforms in high-speed Spin Echo method) and/or between imaging protocols (e.g., reuse of waveforms of fat saturation) in order to achieve full virtualization of an imaging protocol including pulse sequences for actual use in the MRI apparatus or pulse sequences depending on types of examination. In this regard the MR simulation process performed by the magnetic resonance simulation apparatus 1 can significantly shorten the length of computation time for the magnetic resonance simulation and implement higher-speed magnetic resonance simulations.

In a situation that the magnetic resonance simulation apparatus 1 is used at a development site, the magnetic resonance simulation apparatus 1 performs magnetic resonance simulations with fully virtually the same waveform while editing the pulse sequence many times, i.e., adjusting the same RF & Gradient pattern many times. Because of this, the MR simulation process performed by the magnetic resonance simulation apparatus 1 can significantly shorten the length of computation time for the magnetic resonance simulation.

Figure 5:
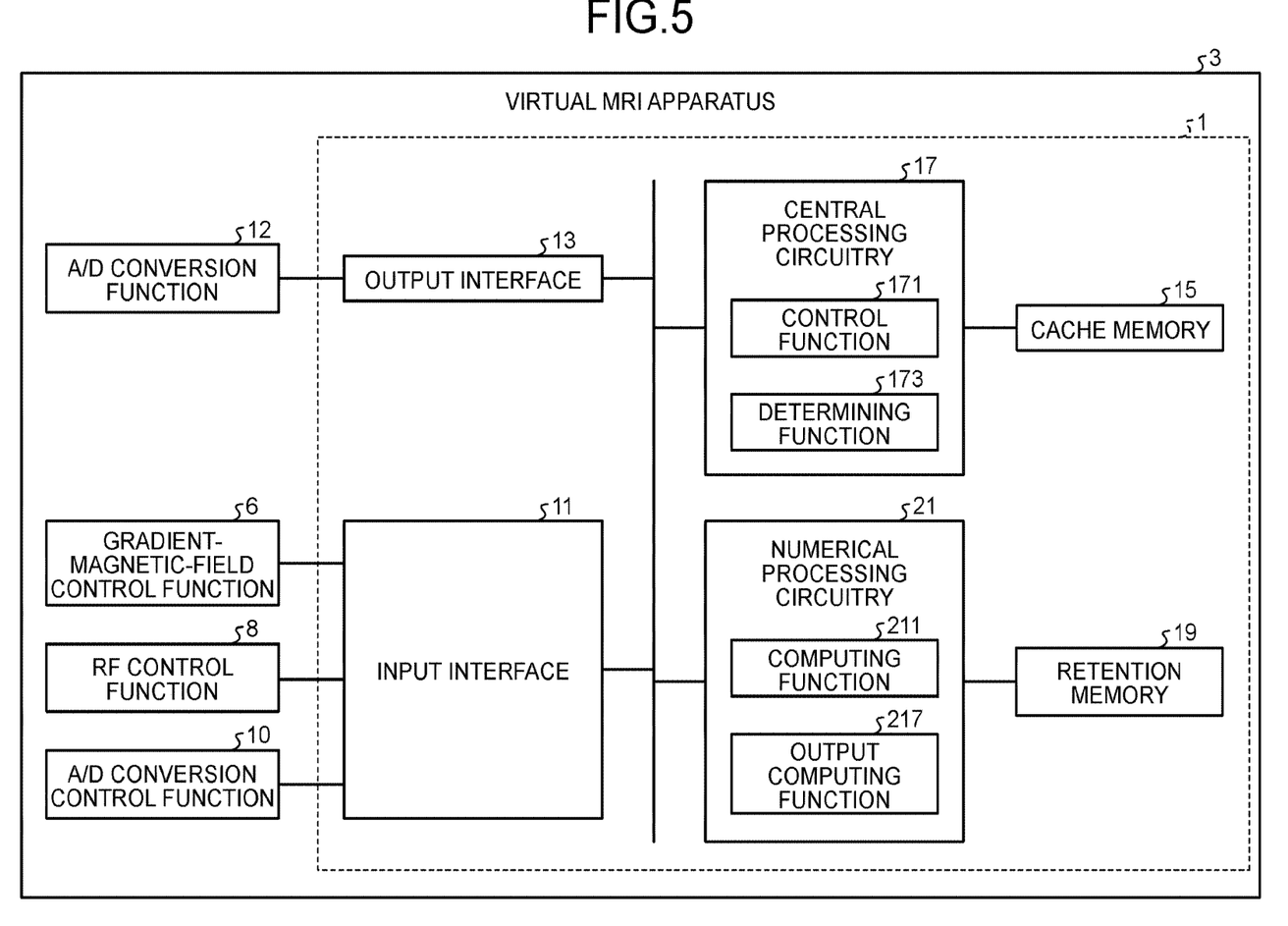
FIG. 5 illustrates a configuration of an exemplary virtual MRI apparatus according to an embodiment.

Further, the magnetic resonance simulation apparatus 1 can decrease the computation time for full virtualization, therefore, it can be implemented as a virtual MRI apparatus by way of exemplary application of an embodiment. FIG. 5 illustrates the configuration of a virtual MRI apparatus 3 according to an embodiment by way of example. As illustrated in FIG. 5, the virtual MRI apparatus 3 includes a gradient-magnetic-field control function 6, an RF control function 8, an A/D conversion control function 10, and an A/D conversion function 12, in addition to the elements of the magnetic resonance simulation apparatus 1 of FIG. 1. The gradient-magnetic-field control function 6, the RF control function 8, the A/D conversion control function 10, and the A/D conversion function 10 may be implemented by any of various kinds of processors such as sequence control circuitry.

The gradient-magnetic-field control function 6 outputs gradient-magnetic-field control information to the input interface 11. Specifically, the gradient-magnetic-field control function 6 outputs to the input interface 11 information related to a gradient magnetic field strength according to currents supplied from the gradient-magnetic-field power supply to the gradient coil, gradient-magnetic-field application timing, and/or a length of gradient-magnetic-field application time, for example.

The RF control function 8 outputs RF-pulse control information to the input interface 11. Specifically, the RF control function 8 outputs to the input interface 11 information related to RF-pulse intensity according to currents supplied from the transmitter circuitry to the transmission coil and/or RF-pulse flip angle and application timing, for example.

The A/D conversion control function 10 outputs MR-signal acquisition information to the input interface 11. Specifically, the A/D conversion control function 10 outputs to the input interface 11 information related to detection timing at which the receiver circuitry detects magnetic resonance signals, sampling frequency at the time of sampling magnetic resonance signals, and/or a duration of A/D conversion to magnetic resonance signals, for example.

The A/D conversion function 10 converts the output values from the output interface 13 into digital data.

As illustrated in FIG. 5, the magnetic resonance simulation apparatus 1 of FIG. 1 is incorporated in the virtual MRI apparatus 3. The procedure and effects of the MR simulation process executed by the virtual MRI apparatus 3 of FIG. 5 are similar to or the same as those of the embodiments, therefore, a description thereof is omitted herein. The virtual MRI apparatus 3 including the magnetic resonance simulation apparatus 1 can use the gradient-magnetic-field control function 6, the RF control function 8, and the A/D conversion control function 10 of FIG. 5 as inputs to the magnetic resonance simulation apparatus 1. Thereby, the virtual MRI apparatus 3 can be utilized as a debug apparatus (defect analyzer) that removes bugs (defects) in the software part of the virtual MRI apparatus 3.

To implement the technical idea of some embodiments by a magnetic resonance simulation method, the magnetic resonance simulation method includes inputting a subsequence of a magnetic resonance pulse sequence, the subsequence being to be a subject of a simulation of a magnetic resonance phenomenon; inputting a plurality of isochromats having a same $B_0$ shift at different positions corresponding to subvoxels which are segments of each of voxels related to the simulation of a magnetic resonance phenomenon; determining, based on the subsequence, two or more isochromats exhibiting equivalent magnetic resonance phenomenal behaviors as equivalent isochromats from the plurality of isochromats; and collectively simulating magnetic resonance phenomenal behaviors of the equivalent isochromats due to the subsequence by the same computation. The procedure and effects of the MR simulation process executed by the magnetic resonance simulation method are similar to or the same as those of the embodiments, therefore, a description thereof is omitted herein.

To implement the technical idea of some embodiments by a magnetic resonance simulation program, the magnetic resonance simulation program includes inputting a subsequence of a magnetic resonance pulse sequence, the subsequence being to be a subject of a simulation of a magnetic resonance phenomenon; inputting a plurality of isochromats having a same $B_0$ shift at different positions corresponding to subvoxels which are segments of each of voxels related to the simulation of a magnetic resonance phenomenon; determining, based on the subsequence, two or more isochromats exhibiting equivalent magnetic resonance phenomenal behaviors as equivalent isochromats from the plurality of isochromats; and collectively simulating magnetic resonance phenomenal behaviors of the equivalent isochromats due to the subsequence by the same computation.

As an example, the magnetic resonance simulation program may be installed in a computer included in the MRI apparatus or any of various kinds of simulation servers, and loaded on the memory to implement the MR simulation process. In this case the program for causing the computer to execute the MR simulation process can be stored and distributed in a storage medium such as a magnetic disk (e.g., hard disk), an optical disk (e.g., CD-ROM, DVD), or a semiconductor memory. In addition to using such a storage medium for distribution, the magnetic resonance simulation program may be distributed by way of electronic communication means, such as downloading via the Internet. The procedure and effects of the magnetic resonance simulation program are similar or the same as those in the embodiments, therefore, a description thereof is omitted herein.

According to at least one of the embodiments as described above, it is possible to reduce a decrease in computation speed in the magnetic resonance simulation involving an increased number of subvoxels.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic resonance simulation apparatus, comprising:
    an input interface configured to input:
        a subsequence of a magnetic resonance pulse sequence, the subsequence being a subject of a simulation of a magnetic resonance phenomenon, and
        a plurality of isochromats having a same $B_0$ shift at different positions corresponding to subvoxels which are segments of each of voxels related to the simulation of the magnetic resonance phenomenon;
    central processing circuitry configured to determine, based on the subsequence, two or more isochromats exhibiting equivalent magnetic resonance phenomenal behaviors as equivalent isochromats, from the plurality of isochromats; and
    numerical processing circuitry configured to collectively simulate the magnetic resonance phenomenal behaviors of the equivalent isochromats due to the subsequence by a same computation.

2. The magnetic resonance simulation apparatus according to claim 1, wherein
    the central processing circuitry is further configured to determine two or more isochromats aligned in one or more particular directions as the equivalent isochromats.

3. The magnetic resonance simulation apparatus according to claim 2, wherein the central processing circuitry is further configured to:
    determine whether magnetic fields in a plurality of directions have positional dependence, based on the subsequence, and
    determine, from the plurality of directions, one or more directions in which the magnetic fields have no positional dependence as the one or more particular directions.

4. The magnetic resonance simulation apparatus according to claim 3, wherein
    the plurality of directions corresponds to three orthogonal axes, and
    the central processing circuitry is further configured to determine a presence or an absence of the positional dependence in each of directions along the three orthogonal axes, based on the subsequence.

5. The magnetic resonance simulation apparatus according to claim 3, wherein
    the central processing circuitry is further configured to refrain from determining a presence or an absence of the positional dependence when the subsequence does not include application of a gradient magnetic field.

6. The magnetic resonance simulation apparatus according to claim 3, wherein
    when the subsequence, including application of an RF pulse and a gradient magnetic field, is applied, the numerical processing circuitry is further configured to simulate the magnetic resonance phenomenal behaviors due to the subsequence for the equivalent isochromats having a same transmitting sensitivity to the RF pulse.

7. The magnetic resonance simulation apparatus according to claim 3, wherein
    when the subsequence, including application of a gradient magnetic field and acquisition of magnetic resonance signals for analog-to-digital conversion, is applied, the numerical processing circuitry is further configured to simulate the magnetic resonance phenomenal behaviors due to the subsequence for the equivalent isochromats having a same receiving sensitivity to the magnetic resonance signals.

8. The magnetic resonance simulation apparatus according to claim 3, wherein when the subsequence, including application of a gradient magnetic field and acquisition of magnetic resonance signals for analog-to-digital conversion, is applied, the numerical processing circuitry is further configured to compute a sum of magnetizations in isochromats aligned in the particular directions and simulate the magnetic resonance phenomenal behaviors due to the subsequence for the sum of magnetizations.

9. The magnetic resonance simulation apparatus according to claim 1, wherein the plurality of isochromats corresponds to an ensemble with a plurality of physical parameters at a representative point representing the subvoxels.

10. A magnetic resonance simulation method, comprising:

inputting a subsequence of a magnetic resonance pulse sequence, the subsequence being a subject of a simulation of a magnetic resonance phenomenon;

inputting a plurality of isochromats having a same $B_0$ shift at different positions corresponding to subvoxels which are segments of each of voxels related to the simulation of the magnetic resonance phenomenon;

determining, based on the subsequence, two or more isochromats exhibiting equivalent magnetic resonance phenomenal behaviors as equivalent isochromats, from the plurality of isochromats; and collectively simulating magnetic resonance phenomenal behaviors of the equivalent isochromats due to the subsequence by a same computation.

11. A computer-readable, nonvolatile storage medium storing a magnetic resonance simulation program for causing a computer to execute:

inputting a subsequence of a magnetic resonance pulse sequence, the subsequence being a subject of a simulation of a magnetic resonance phenomenon;

inputting a plurality of isochromats having a same $B_0$ shift at different positions corresponding to subvoxels which are segments of each of voxels related to the simulation of the magnetic resonance phenomenon;

determining, based on the subsequence, two or more isochromats exhibiting equivalent magnetic resonance phenomenal behaviors as equivalent isochromats, from the plurality of isochromats; and collectively simulating magnetic resonance phenomenal behaviors of the equivalent isochromats due to the subsequence by a same computation.

* * * * *